United States Patent
Wan (10) Patent No.: US 8,475,752 B2
(45) Date of Patent: Jul. 2, 2013

(54) NOX ADSORBER CATALYST WITH SUPERIOR LOW TEMPERATURE PERFORMANCE

(75) Inventor: Chung Z. Wan, Somerset, NJ (US)

(73) Assignee: BASF Corporation, Florham Park, NJ (US)

(*) Notice: Subject to any disclaimer, the term of this patent is extended or adjusted under 35 U.S.C. 154(b) by 750 days.

(21) Appl. No.: 12/490,252

(22) Filed: Jun. 23, 2009

(65) Prior Publication Data
US 2009/0320457 A1    Dec. 31, 2009

Related U.S. Application Data

(60) Provisional application No. 61/076,560, filed on Jun. 27, 2008.

(51) Int. Cl.
| | |
|---|---|
| B01D 53/94 | (2006.01) |
| B01D 53/56 | (2006.01) |
| B01J 23/02 | (2006.01) |
| B01J 23/10 | (2006.01) |
| B01J 23/40 | (2006.01) |
| F01N 3/28 | (2006.01) |

(52) U.S. Cl.
USPC .............. 423/213.2; 423/213.5; 423/213.7; 60/297; 60/299; 60/301; 502/527.12; 502/304; 502/325; 502/340; 502/344

(58) Field of Classification Search
USPC ............... 423/213.2, 213.5, 213.7; 60/297, 60/299, 301; 502/527.12, 304, 325, 340, 502/344
See application file for complete search history.

(56) References Cited

U.S. PATENT DOCUMENTS

| | | | |
|---|---|---|---|
| 5,075,275 A | 12/1991 | Murakami et al. | |
| 5,412,945 A | 5/1995 | Katoh et al. | |
| 5,473,887 A | 12/1995 | Takeshima et al. | |
| 5,547,913 A | 8/1996 | Muramoto | |
| 5,750,082 A * | 5/1998 | Hepburn et al. | 423/213.5 |
| 5,874,057 A * | 2/1999 | Deeba et al. | 423/239.1 |
| 6,159,897 A | 12/2000 | Suzuki et al. | |
| 6,245,307 B1 * | 6/2001 | Inui et al. | 423/213.5 |
| 6,254,842 B1 * | 7/2001 | Hu et al. | 423/213.5 |
| 6,348,430 B1 * | 2/2002 | Lindner et al. | 502/304 |
| 6,413,904 B1 | 7/2002 | Streblau et al. | |
| 6,514,905 B1 | 2/2003 | Hanaki et al. | |
| 7,404,933 B2 | 7/2008 | Twigg | |
| 2002/0031452 A1 | 3/2002 | Okamoto et al. | |
| 2009/0196811 A1 | 8/2009 | Yamashita et al. | |
| 2009/0260349 A1 * | 10/2009 | Gandhi et al. | 60/286 |

FOREIGN PATENT DOCUMENTS

| | | |
|---|---|---|
| EP | 1243766 A | 9/2002 |
| EP | 1974809 A | 10/2008 |

* cited by examiner

*Primary Examiner* — Timothy Vanoy
(74) *Attorney, Agent, or Firm* — Melanie L. Brown (57) ABSTRACT

The lean NOx trap catalyst composition of the present invention comprises distinct layers, or zone configuration or multi-brick arrangement. The top layer, front zone or front brick is free of any alkali or alkaline earth NOx trapping components. The under layer, rear zone or rear brick may contain any desirable NOx trapping component in contact with a precious metals group catalyst (e.g., Pt). Catalysts of this invention show wide temperature operation window with superior low temperature performance.

18 Claims, 5 Drawing Sheets

NOX ADSORBER CATALYST WITH SUPERIOR LOW TEMPERATURE PERFORMANCE

This patent application claims priority to pending patent application Ser. No. 61/076,560 filed Jun. 27, 2008 incorporated herein in its entirety.

FIELD OF THE INVENTION

The present invention is directed to a lean NOx trap system for NOx abatement, especially with NOx abatement in the exhaust gas of lean-burn internal combustion engines. More specifically, the present invention is concerned with a novel composition comprising a lean NOx trap catalyst, and to a method of using the same.

BACKGROUND OF THE INVENTION

Catalysts are employed in the exhaust systems of automotive vehicles to convert carbon monoxide, hydrocarbons, and nitrogen oxides (NOx) produced during engine operation into harmless gases. When the engine is operated in a stoichiometric or slightly rich air/fuel (A/F) ratio, catalysts containing palladium, platinum, and/or rhodium are able to efficiently convert all three gases simultaneously. That is, the carbon monoxide and hydrocarbons are oxidized to carbon dioxide and water and the NOx is reduced to nitrogen. Hence, such catalysts are often called "three-way" catalysts. It is desirable, however, to operate the engine in a "lean-burn" condition where the A/F ratio is greater than the 14.4-14.7 stoichiometric range, generally between 19 and 27, to realize a benefit in fuel economy. While such precious metal three-way catalysts are able to efficiently convert carbon monoxide and hydrocarbons during lean-burn (excess oxygen) operation, they are not efficient in converting the NOx under lean-burn conditions. Lean-burn, high air-to-fuel ratio, and diesel engines are certain to become more important in meeting the mandated fuel economy requirements of next-generation vehicles, the control of NOx emissions from the vehicles continues to post a challenge. Thus, development of an effective and durable catalyst for controlling NOx emissions under net oxidizing conditions accordingly is urgently needed.

Catalysts containing platinum and zeolite are known to be active for NOx reduction by hydrocarbons under lean conditions. However, this catalytic activity is significant only in a narrow temperature range around the light-off temperature of heavy hydrocarbon oxidation, typically between 180° C. and 250° C. Above the light-off temperature, the lean-NOx catalysts quickly lose their catalytic activity because almost all hydrocarbon reductant completely oxidized and not available for NOx reduction. This narrow temperature window of the lean-NOx catalysts is considered to be one of the major technical obstacles, because it makes practical application of these catalysts difficult (for lean-burn gasoline or diesel engines). Base metal containing zeolite catalysts shows activity of NOx reduction by hydrocarbons at higher temperature, typically above 300° C. But they exhibit very little NOx conversion at lower temperatures. In addition, these catalysts deactivate irreversibly if a certain temperature is exceeded. Catalyst deactivation is also found to be accelerated by the presence of water vapor and sulfur containing compound. Thus, it is difficult to consider for commercial use.

Alternative is to employ selective catalytic reduction (SCR) technology using ammonia or urea as a reductant. Vanadium containing and certain zeolite containing catalysts are found to be quite efficient in selective reduction of NOx to $N_2$ in a lean exhaust. Commercial use of SCR technology has been developed for heavy duty diesel application. However, urea supply infra-structure and OBD requirement make SCR technology difficult to apply to all lean burn vehicles. Thus, the art continues to search NOx reduction technology using on-board fuel system.

One effective method to reduce NOx from the exhaust of lean-burn engines, such as gasoline direct injection and partial lean-burn engines, as well as from diesel engines, requires trapping and storing of NOx under lean burn engine operating conditions and reducing the trapped NOx under stoichiometric or rich engine operating conditions or lean engine operating with external fuel injected in the exhaust to induce rich conditions. The lean operating cycle is typically between 1 minute and 20 minutes and the rich operating cycle is typically short (1 to 10 seconds) to preserve as much fuel as possible. To enhance NOx conversion efficiency, the short and frequent regeneration is favored over long but less frequent regeneration. Thus, a lean NOx trap catalyst generally must provide a NOx trapping function and a three-way conversion function.

The lean-NOx-trap technology has been limited to use for low sulfur fuels because catalysts that are active for converting NO to $NO_2$ are also active in converting $SO_2$ to $SO_3$. Lean NOx trap catalysts have shown serious deactivation in the presence of SOx because, under oxidized conditions (exhaust containing excess oxygen), SOx adsorbs more strongly on $NO_2$ adsorption sites than $NO_2$, and the adsorbed SOx does not desorb under fuel-rich conditions in normal operating conditions. It is found that the surface adsorbed SOx can be removed at high temperature, typically greater than 600° C. under rich (reducing) conditions. Periodic removal of sulfur accumulated on the catalyst tends to rejuvenate the performance and useful life of the lean NOx trap can be prolonged. In new generation of diesel powered vehicles (MY2007 and beyond), many have equipped with a diesel particulate filter (DPF) device to remove the harmful carbonaceous particles. The particulate filter periodic goes through a regeneration cycle, typically around 600° C. to burn off the collected soot. In an exhaust aftertreatment system containing DPF and LNT, it is advantageous to incorporate a sulfur removal event during the regeneration of the particulate filter. Thus, a cost effective sulfur removal process can be easily achieved. In 2007 and beyond, diesel fuel sulfur has been mandated to lower to less than 15 ppm. The advance in engine design, exhaust aftertreatment device and low sulfur fuel makes the lean NOx trap technology attractive for the reduction of NOx emissions from a diesel engine.

Current lean NOx trap (LNT) systems contain alkali and alkaline earth (e.g., Ba) elements. The alkaline earth containing LNT systems show good and durable NOx conversion efficiency between 250° C. and 450° C. However, the LNT exhibits limited NOx conversion below 250° C. It is believed that the presence of trapping components (e.g., Ba) in the LNT catalyst hinders the intrinsic activity of NO oxidation and NOx reduction over the precious metal elements at low temperatures (<250° C.) especially after exposure to high temperature in excess of 750° C. in a lean environment (containing excess oxygen). Since exhaust temperature of a diesel engine under low load and low speed conditions (e.g., FTP75 driving cycle) typically runs below 250° C., it is highly desirable that a lean NOx trap (LNT) catalyst system performs well at such conditions. The novel catalyst systems of the present invention overcome the deficiency of low temperature performance of current lean NOx trap systems.

SUMMARY OF THE INVENTION

The present invention is directed to a combined lean NOx trap and catalyst system (lean NOx trap/catalyst) for NOx abatement in lean burn engines, e.g., a diesel engine. The lean NOx trap/catalyst system of the present invention comprises at least two distinct catalyst washcoat layers for the treatment of exhaust gas emissions, such as unburned hydrocarbons (HC), carbon monoxides (CO) and nitrogen oxides (NOx). More particularly, the catalyst composition of the invention is designed to reduce pollutants, e.g., NOx, in automotive engine exhaust gas streams at temperatures from about 100° C. to about 500° C.

The washcoat layers of the present invention may comprise at least one layer containing NOx trapping component such as alkaline earth elements and at least one layer containing ceria and substantially free of alkaline earth elements. Both layers are capable of adsorbing NOx during lean-burn conditions and reducing the trapped NOx during rich-burn conditions. In accordance with the present invention, multiple washcoat configurations can be used.

In one embodiment, the present invention provides a lean NOx trap/catalyst for treatment of exhaust gas emissions, comprising: (a) a carrier substrate; (b) an undercoat washcoat layer comprising a support material, at least one precious metal, and at least one NOx trapping component selected from the group consisting of alkaline earth elements and/or rare earth elements, wherein said undercoat washcoat layer is one the carrier substrate (a); and (c) a top washcoat layer comprising a support material, at least one precious metal, and ceria in particulate form, the top washcoat layer being substantially free of alkaline earth components.

DETAILED DESCRIPTION OF THE INVENTION

It has been well known in the art that a traditional three-way catalyst containing a combination of oxides of rare earth elements and alkaline earth elements can retard the degradation of catalyst containing platinum-group elements against high temperature aging. A catalyst composition comprising active alumina bearing platinum-group metals, cerium oxide, a barium compound and a zirconium compound is particularly effective for maintaining catalyst activity after high temperature aging as described in U.S. Pat. No. 4,965,243. The same TWC catalyst composition has been found to be effective also as a NOx trap/catalyst. The presence of cerium oxide and barium component in the composition can adsorb large amount of nitrogen oxides in a net oxidizing atmosphere. In a net reducing atmosphere, the adsorbed nitrogen oxides convert to harmless nitrogen with the help of the platinum group metals in the catalyst. Thus, a traditional TWC catalyst can be a decent NOx trap/catalyst for a different application (e.g., lean burn engine application).

Typically, a TWC catalyst operates between 250° C. and 550° C. in a stoichiometric petroleum engine and catalyst performances lower than 250° C. generally are not a concern. However, catalyst in a lean burn passenger car engine (e.g. light duty diesel) may operate with significant amount of time below 250° C. Thus, a traditional TWC catalyst is found deficient in performances in such application. It is found that the intimate contact of platinum group metals with the alkaline earth elements in a traditional TWC catalyst composition significantly reduce the low temperature activity of the catalyst. Once the nitrogen oxides adsorb on the catalyst in a net lean condition, they are difficult to react and convert in a net rich condition at a temperature lower than 250° C. Thus, it becomes apparent that physical segregation of platinum group metals and alkaline earth elements may be necessary to improve the low temperature performances. Interestingly, ceria in particulate form with the presence of platinum group metals not only enhances the NOx trapping efficiency at lower temperatures (especially below 250° C.) in a net lean conditions, but also can activate the conversion of adsorbed nitrogen oxides in a net rich condition at the same low temperature. These learnings immediately led us to the discovery of the present invention.

The present invention is directed to a method and a lean NOx trap/catalyst system treating gaseous emissions from a lean burn engine, e.g., a diesel engine. In particular, the present invention is directed to a novel lean NOx trapping/catalyst washcoat composition comprising at least two distinct washcoat layers containing NOx trapping components and catalyst components for the treatment of exhaust gas emissions, such as carbon monoxide (CO), unburned hydrocarbons (HCs) and nitrogen oxides (NOx). The lean NOx trap/catalyst system of the present invention may comprise distinct layers coated onto a single substrate member, a zone configuration or a multiple-brick arrangement wherein separate bricks within the system are coated with the distinct washcoat layers. At least one layer composition containing NOx trapping components comprising alkaline earth elements and at least another layer composition containing NOx trapping components comprising ceria and substantially free of alkaline earth elements. The catalyst compositions of this invention show wide temperature operation window with superior low temperature performance. The novel catalyst washcoat composition of the present invention is designed to reduce exhaust gas emissions in automotive engine exhaust gas streams at temperatures from about 100° C. to about 500° C. Engine exhaust gas stream temperatures below about 350° C., below about 250° C., below about 200° C. are also exemplified.

The catalyst composition of the present invention comprises a first or front zone or top washcoat layer and a second or rear zone or undercoat washcoat layer. The first of front zone or top washcoat layer is the first washcoat layer an exhaust gas stream from the engine comes into contact with. Whereas, the second or rear or undercoat washcoat layer is the second washcoat layer the exhaust gas stream comes into contact with (i.e., the exhaust gas stream comes into contact with the second washcoat layer after coming into contact with the first washcoat layer).

The first or top washcoat layer comprises one or more supported precious metal catalysts and ceria as a NOx trapping component or sulfur scavenger. Importantly, the first or top washcoat layer is free or devoid of any alkali or alkaline earth components, which are believed to hinder NO oxidation over the precious metal catalyst at low temperatures (typically <350° C.). As such, the top washcoat layer is capable of oxidizing NOx at temperatures below 350° C. In fact, the inventors have surprisingly found that the top washcoat composition of the present invention is capable of oxidizing NOx at temperatures below 250° C., below 200° C. and even below 150° C. Additionally, the top washcoat layer is capable of reducing unburned hydrocarbons and carbon monoxides at temperatures below 350° C. The second or undercoat layer comprises one or more NOx trapping components in intimate contact with one or more supported precious metal catalysts for the treatment of exhaust gas emissions. Preferably, the second or undercoat layer comprises one or more alkali or alkaline earth components as NOx trapping components.

In one embodiment, the lean NOx trap/catalyst of the present invention may comprise a novel trapping/catalyst composition, which comprises two distinct washcoat layers coated on a single substrate or carrier member, one layer (e.g., a top washcoat layer) over top of the other (e.g., an undercoat washcoat layer). In this embodiment, the undercoat washcoat layer is coated over the entire axial length of a substrate (e.g., a flow-through monolith) and the top washcoat layer is coated over the entire axial length of the undercoat washcoat layer. In accordance with the present invention top washcoat layer comprises one or more supported precious metals for the treatment of exhaust gas emissions, and optionally may contain ceria, but is devoid of any alkali or alkaline earth components. The undercoat layer may contain one or more NOx trapping components or NOx adsorbents, which selectively and reversibly adsorb nitrogen oxides from exhaust gas streams. The undercoat washcoat layer may also contain one or more precious metal catalysts for the treatment of exhaust gas emissions. Under lean burn conditions, the undercoat washcoat layer of the present invention can simultaneously store nitrogen oxides (NOx) and catalyzes the conversion of hydrocarbons and carbon monoxide in exhaust gas streams and the top washcoat layer can catalyze the oxidation of nitrogen oxides (NOx). Under subsequent rich burn conditions excess stored NOx can be released and oxidized by the catalysts contained in both the top and undercoat washcoat layers.

Figure 1:
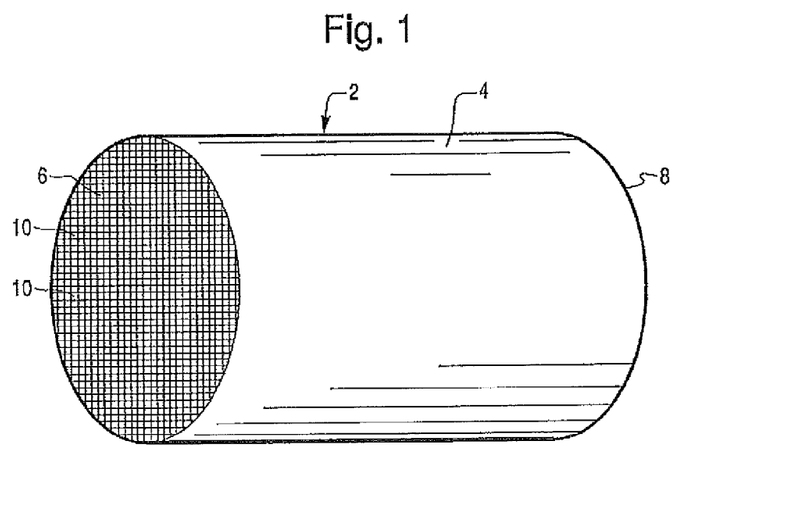
FIG. 1 is a perspective view of a honeycomb-type refractory carrier member which may comprise a NOx trap member or a NOx catalyst member in accordance with the present invention.
Figure 2:
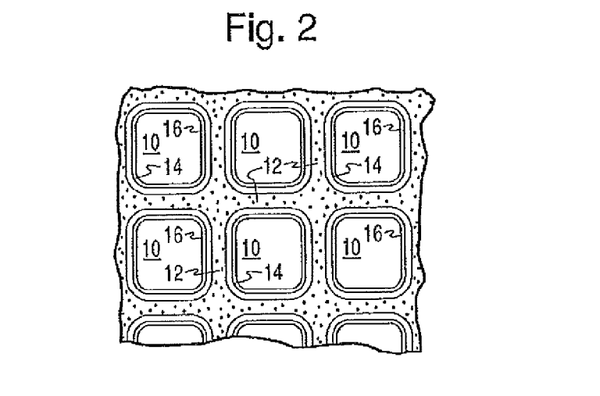
FIG. 2 is a partial cross-sectional view enlarged relative to FIG. 1 and taken along a plane parallel to the end faces of the carrier of FIG. 1, which shows an enlarged view of one of the gas flow passages shown in FIG. 1.

The lean NOx trap/catalyst of this embodiment may be more readily appreciated by reference to FIGS. 1 and 2. FIGS. 1 and 2 show a refractory carrier member 2, in accordance with one embodiment of present invention. Referring to FIG. 1, the refractory carrier member 2 is a cylindrical shape having a cylindrical outer surface 4, an upstream end face 6 and a downstream end face 8, which is identical to end face 6. Carrier member 2 has a plurality of fine, parallel gas flow passages 10 formed therein. As seen in FIG. 2 flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 2 walls 12 are so dimensioned and configured that gas flow passages 10 have a substantially regular polygonal shape, substantially square in the illustrated embodiment, but with rounded corners in accordance with U.S. Pat. No. 4,335,023, issued Jun. 15, 1982 to J. C. Dettling et al. A discrete layer undercoat layer 14, which in the art and sometimes below is referred to as a "washcoat", is adhered or coated onto the walls 12 of the carrier member. As shown in FIG. 2, a second discrete washcoat layer or top layer 16 is coated over the undercoat washcoat layer 14. In accordance with the present invention, the top washcoat layer 16 comprises one or more supported precious metal catalysts, ceria, and is devoid of any alkali or alkaline earth components. The undercoat washcoat layer 16 comprises one or more NOx trap materials in intimate contact with one or more supported precious metals.

As shown in FIG. 2, the carrier member include void spaces provided by the gas-flow passages 10, and the cross-sectional area of these passages 10 and the thickness of the walls 12 defining the passages will vary from one type of carrier member to another. Similarly, the weight of washcoat applied to such carriers will vary from case to case. Consequently, in describing the quantity of washcoat or catalytic metal component or other component of the composition, it is convenient to use units of weight of component per unit volume of catalyst carrier. Therefore, the units grams per cubic inch ("g/in$^3$") and grams per cubic foot ("g/ft$^3$") are used herein to mean the weight of a component per volume of the carrier member, including the volume of void spaces of the carrier member.

During operation, exhaust gaseous emissions from a lean burn engine comprising hydrocarbons, carbon monoxide, nitrogen oxides, and sulfur oxides initially encounter the top washcoat layer 16, and thereafter encounter the undercoat washcoat layer 14.

Any suitable carrier or substrate may be employed, such as a monolithic carrier of the type having a plurality of fine, parallel gas flow passages extending therethrough from an inlet or an outlet face of the carrier, so that the passages are open to fluid flow therethrough. The passages, which are essentially straight from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular. Such monolithic carriers may contain up to about 700 or more flow channels ("cells") per square inch of cross section, although far fewer may be used. For example, the carrier may have from about 60 to 600, more usually from about 200 to 400, cells per square inch ("cpsi").

The carrier may comprise a refractory ceramic or metal having a honeycomb structure. Suitable refractory ceramic materials include alumina, silica, titania and zirconia compounds, e.g., cordierite (which is preferred), cordierite-alpha alumina, silicon nitride, zircon mullite, spodumene, alumina-silica magnesia, zircon silicate, sillimanite, magnesium silicates, zircon petalite, alpha alumina and aluminosilicates. A metallic honeycomb may be made of a refractory metal such as stainless steel or other suitable iron-based corrosion-resistant alloys.

Figure 4:
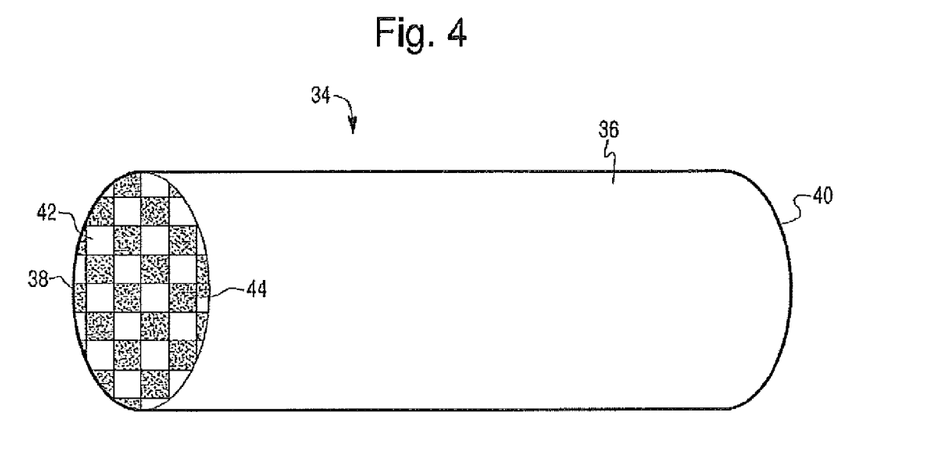
FIG. 4 is a perspective view of a particulate filter-type refractory carrier member which may comprise a NOx trap/catalyst member in accordance with the present invention.
Figure 5:
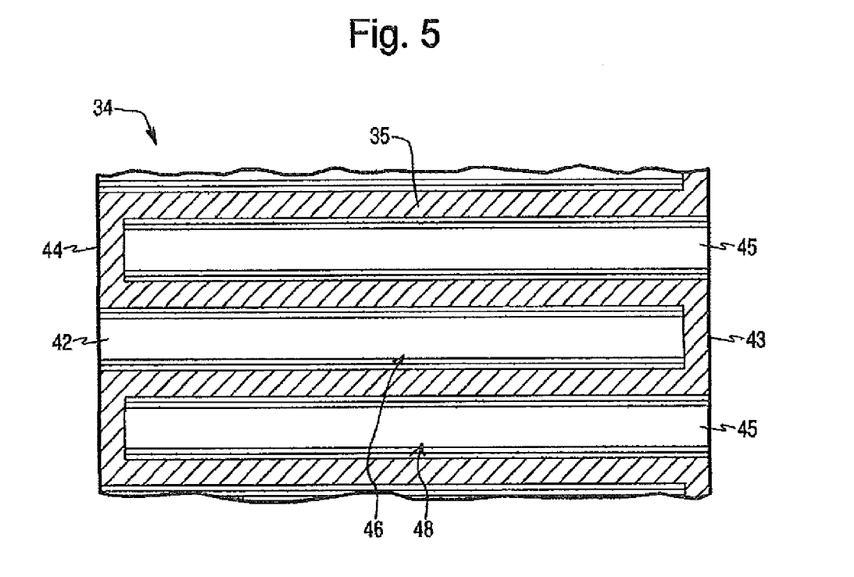
FIG. 5 is a partial cross sectional view enlarged relative to FIG. 4 and taken along a plane perpendicular to the end faces of the carrier of FIG. 4, which shows a schematic view of a configuration of the inlet channel wall coating (top coat layer) and the outlet wall coating (undercoat layer) on a lean NOx trap/catalyst/filter, in accordance with one embodiment of the present invention.

In yet another embodiment, the distinct washcoat layers of the present invention can be coated on a wall-flow substrate. FIGS. 4 and 5 illustrate a wall-flow monolith 34, which has a plurality of passages 42 and 45. The passages can be described as the inlet passage 42 and outlet passage 45 and are tubularly enclosed by the internal walls 35 of the wall-flow monolith 34. The wall-flow monolith 34 has an inlet end 44 and an outlet end 43. Alternate passages are plugged at the inlet end 44 with inlet plugs 38, and at the outlet end 40 with outlet plugs (not shown) to form opposing checkerboard patterns at the ends of the inlet 44 and outlet 43 ends. A gas stream enters through the unplugged channel inlet at the inlet end 44, and flows through passage 42. The gas flow is stopped by the outlet plug and diffuses through the internal walls 35 (which are porous) to the outlet passage 45 and exits the monolith. The gas cannot pass back to the inlet side of walls because of inlet plugs 38.

Preferred wall-flow filters are composed of ceramic-like materials such as cordierite, α-alumina, silicon carbide, silicon nitride, zirconia, mullite, spodumene, alumina-silica-magnesia, zirconium silicate, or of refractory metals such as stainless steel. Preferred wall-flow filters are formed from cordierite and silicon carbide. Such materials are able to withstand the environment, and particularly high temperatures encountered in treating the exhaust gas streams.

Preferred wall-flow filters for use in the inventive system include thin porous walled honeycombs (monolith)s through which the fluid stream passes without causing too great an increase in backpressure or pressure across the article. Ceramic wall-flow substrates used in the system are preferably formed of a material having a porosity of from about 30 to about 75%, having a mean pore size of at least 5 microns (e.g., from 5 to 30 microns). More preferred are substrates having wall porosity, typically from about 40 to about 65%. When substrates with these porosities and these mean pore sizes are coated with the techniques described herein, adequate levels of the sub-micron catalyst washcoat composition can be coated onto the substrates to achieve excellent CO, HC and NOx conversion efficiency and allow these substrates to maintain adequate exhaust flow characteristics, i.e., acceptable backpressures. U.S. Pat. No. 4,329,162 is herein incorporated by reference with respect to the disclosure of suitable wall-flow substrates.

The porous wall-flow filter used in this invention is catalyzed in that the wall of said element has thereon or contained therein one or more washcoat compositions in accordance with the present invention, as described herein. The washcoat may be coated on the inlet side of the element wall alone, the outlet side alone, within the pores of the wall itself, or the inlet and outlet sides and within the pores of the wall.

For the purposes of the present invention, when the catalyst composition of the invention is coated onto such a carrier, typically as a washcoat, the amounts of the various components are presented based on grams per volume. When the ingredients are applied as a thin coating to a carrier substrate, the amounts of ingredients are conventionally expressed as grams per cubic foot ($g/ft^3$) of the carrier for the precious metal component(s) and grams per cubic inch ($g/in^3$) of the carrier for the other ingredients (i.e., the composite and the support) as this measure accommodates different gas flow passage cell sizes in different monolithic carrier substrates.

The discrete top and undercoat layers of catalytic and/or trapping materials, conventionally referred to herein as "washcoats", are coated onto a suitable carrier with, preferably, the undercoat washcoat layer adhered to the carrier and the top washcoat layer overlying and adhering to the undercoat layer. With this arrangement, the gas being contacted with the catalyst, e.g., being flowed through the passageways of the catalytic material-coated carrier, will first contact the top coat and pass therethrough in order to contact the underlying undercoat. However, in an alternative configuration (discussed in more detail hereinbelow), the top coat need not overlie the undercoat coat but may be provided on an upstream (as sensed in the direction of gas flow through the catalyst composition) portion of the carrier, with the undercoat provided on a downstream portion of the carrier. Thus, to apply the washcoat in this configuration, an upstream longitudinal segment only of the carrier would be dipped into a slurry of the second coat catalytic material, and dried, and the unclipped downstream longitudinal segment of the carrier would then be dipped into a slurry of the first coat catalytic material and dried. In yet another alternative embodiment of the present invention (also discussed in more detail hereinbelow), the top washcoat composition may be coated as a single washcoat layer on an upstream carrier or brick which is placed in upstream of a downstream carrier or brick coated with the undercoat composition of the present invention as a single washcoat layer. In this configuration, an exhaust gas stream would first come into contact with the upstream carrier or brick, flow through the upstream carrier or brick, and subsequently come into contact with the downstream carrier or brick.

As previously stated, the top washcoat layer comprises a support, e.g., a refractory metal oxide support, one or more precious metal catalysts to catalyze the oxidation of hydrocarbons and carbon monoxide and the reduction of nitrogen oxides and ceria. In some embodiments, the use of ceria as a NOx trapping component and/or sulfur scavenger may be essential to provide for superior treatment of exhaust gas emissions at low temperatures. The ceria content in this embodiment may range from about 0.1 $g/in^3$ to about 3 $g/in^3$. In general, the precious metal component in the top washcoat layer is selected from the group consisting of platinum, palladium, rhodium, ruthenium, and iridium components. The undercoat washcoat layer comprises a support, e.g., a refractory metal oxide support, and a NOx trapping material. Typically, the NOx trapping material is ranges from about 0.1 $g/in^3$ to about 3 $g/in^3$. NOx trapping materials may including, but are not limited to, oxides, hydroxide, and/or carbonates of alkali metals (e.g., Li, Na, K, Rb, Cs, or Fr), alkaline earth metals (e.g., Ba, Be, Mg, Ca, or Sr), lanthanum group metals (e.g., La, Ce, etc.), compounds containing elements that form stable nitrates (e.g., alkali metal, alkaline earth metals, and/or rare earth metals), ceria or a combination of such elements. Preferably, the NOx trapping material is selected from the group consisting of oxides of calcium, strontium, and barium, potassium, sodium, lithium, and cesium, cerium, lanthanum, praseodymium, and neodymium. More preferably, the NOx trapping materials include barium oxide and strontium oxide. Either of the top or undercoat washcoat layers may additionally comprise a zirconium or cerium component. The undercoat washcoat catalyst/NOx trapping layer stores NOx during lean periods and releases and reduces stored NOx during rich periods. Additionally, under lean conditions, when temperatures are low, the top washcoat catalyst layer catalyzes the oxidation of NOx contained in the exhaust gas stream.

The refractory metal oxide support includes materials such as activated compounds selected from the group consisting of alumina (which is preferred), silica, titania, silica-alumina, alumina-silicates, alumina-zirconia, alumina-chromia, alumina-ceria and mixtures thereof. Typically, the refractory metal oxide support will be present in the amount of about 0.1 to about 4.0 $g/in^3$ of carrier and will be present in the form of finely divided, high surface area particles having a particle size above 10-15 micrometers. Preferably, the activated alumina is thermally stabilized to retard undesirable alumina phase transformations from gamma to alpha at elevated temperatures by doping the activated alumina with a rare earth component such as lanthanum (preferred) or neodymium or mixtures thereof in an amount of about 0.02 to about 0.5 g/in$^3$ of carrier.

Typically, the refractive metal oxide support, e.g., activated alumina, is impregnated with an aqueous solution or dispersion of the precious metal component present as a compound or complex. The selected precious metal compound or complex should be one, which, upon calcination or use thereof, decomposes or otherwise converts to a catalytically active form, usually the metal or metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the platinum group metals are preferred. For example, suitable compounds are chloroplatinic acid, amine-solubilized platinum hydroxide, palladium nitrate or palladium chloride, rhodium chloride, rhodium nitrate, hexamine rhodium chloride, etc. During the calcination step, or at least during the initial phase of use of the catalyst, such compounds are converted into a catalytically active form of the platinum-group metal or a compound thereof.

The precious metal component of both the top and undercoat washcoat compositions comprises one or more catalytic metals selected from the group consisting of gold, silver and platinum group metals (i.e., precious metals). Platinum group metals include platinum, palladium, rhodium, ruthenium and iridium components and mixtures thereof. The precious metal component(s) are typically present in the amount of about 5 to about 500 g/ft$^3$ on the carrier. Precious metal contents from about 25 to 250 g/ft$^3$ and 60 to 150 g/ft$^3$ are also exemplified. The preferred precious metal components are platinum, rhodium or a mixture of platinum and rhodium metal components which are typically present in a platinum:rhodium ratio of about 0.1:1 to about 20:1, preferably 1:1 to 10:1.

A process which can be used to prepare the composite of the present invention starts with the preparation of a zirconium hydroxide sol. This sol can be prepared by precipitating zirconium sulfate with sodium hydroxide at high temperature reflux, typically from 90 to 100° C. to make nanometer-size crystals (typically up to 100 nanometers). Impurities, e.g., sodium, sulfur, etc. can be washed out with an aqueous liquid. An acid, e.g., nitric acid, can be used to break up the aggregates to obtain the zirconium hydroxide sol and to reduce the pH of the liquid. At this stage, any cerium components in the form of salts such as nitrates may be added. The composite sol should be sufficiently acidic, e.g., a pH of 0.5 to 3, preferably, 0.5 to 2.0, at this point in order to keep the salts in solution. The pH can then be quickly increased, e.g., with ammonia, to precipitate the composite compounds. The formation of large aggregates is preferably avoided by controlling the pH. The precipitated composite can then be washed with an aqueous liquid such as deionized water and dried at suitable conditions in air in an oven at temperatures of up to 250° C., typically at 150° C., for as long as necessary, usually overnight. The precipitated composite can then be calcined in air at elevated temperatures to convert the composite to particulate oxide composite which comprises ceria, zirconia and samaria. The calcination process is typically carried out at a temperature of 450 to 750° C., preferably 550° C. for 0.5 to 10 hours, preferably 2 hours. The resultant composite of ceria and zirconia may then be mixed with the precious metal component which has been preferably disposed, i.e., layered or coated, on the refractory metal oxide support.

The catalyst composition may be prepared by mixing the composite prepared as set forth above with the precious metal component and the refractory metal oxide support in the form of an aqueous slurry, comminuting the slurry (i.e., by ball milling), mixing the comminuted slurry with the carrier followed by drying and calcination. However, it is preferred that the composite be mixed with the precious metal component which has been previously disposed on the refractory metal oxide support.

The precious metal component(s) disposed on the refractory metal oxide support may be prepared in the following manner which involves the preparation of an aqueous slurry of the precious metal component(s) and the refractory metal oxide support. The method involves fixing the precious metal component(s) onto at least one support. The fixing step can be any of the suitable fixing steps known in the prior art such as chemical or thermal fixing. A preferred fixing step is to thermally fix the precious metal component(s) to the support. This is preferably conducted in air at a temperature of 50 to 500° C. for about 0.5 to about 2 hours.

In another embodiment, the distinct washcoat layers of the present invention may be zone coated such that one washcoat layer is on the upstream end, and the other washcoat on the downstream end, of the carrier substrate. For example, an upstream washcoat layer can be coated over a portion of the upstream region of the substrate and a downstream washcoat layer can be coated over a downstream portion of the substrate. In this embodiment, the top washcoat layer of the present invention is coated over the upstream potion of the carrier substrate (i.e., the upstream washcoat layer) and the undercoat washcoat layer is coated over a downstream portion of the carrier substrate (i.e., the downstream washcoat layer). The upstream washcoat layer may comprise a supported precious metal catalyst, e.g., platinum supported on alumina and ceria. In accordance with the present invention it is essential that the upstream washcoat layer contains no alkali or alkaline earth components. The complete absence of alkali or alkaline earth components in the upstream washcoat layer prevents a deleterious interaction between the precious metal and the alkali or alkaline earth component under low temperature conditions. The downstream washcoat layer may comprise one or more NOx trapping components (e.g., BaO) in intimate contact with one or more supported precious metal catalysts.

Figure 3:
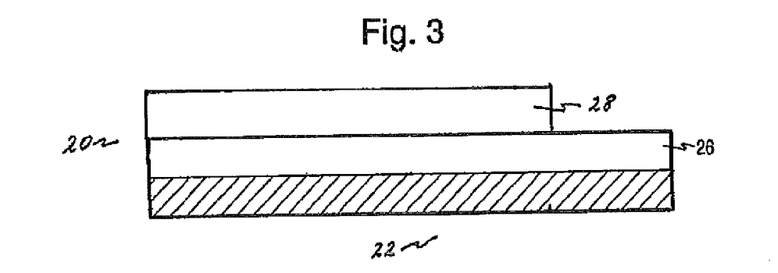
FIG. 3 is a schematic view showing a configuration of the first or undercoat washcoat layer and the second or top washcoat layer on a lean NOx trap/catalyst, in accordance with one embodiment of the present invention.

The catalyst composition of this embodiment may be more easily understood by reference to FIG. 3. As shown in FIG. 3 a novel catalyst composition 20 comprises a carrier member or substrate 22, for example a honeycomb monolith, which contains two separate zone coated washcoated layers, an upstream washcoat layer 24 and a downstream washcoat layer 26. The upstream layer 24 contains one or more supported precious metals, ceria and is devoid of any alkali or alkaline earth components. The downstream washcoat layer 26 may contain one or more NOx trapping components and one or more supported precious metal catalysts. Both the upstream washcoat layer 24 and downstream washcoat layer 26, respectively, generally contain a precious metal loading of from about 5 to 500 g/ft$^3$. Loadings of precious metal from 25 to 250 g/ft$^3$ and 60 to 150 g/ft$^3$ are also exemplified.

In this embodiment, the upstream 24 and downstream 26 washcoat layers, respectively, are each zone coated only over a portion of the substrate 22. However, the combination of the upstream 24 and downstream 26 washcoat layers, respectively, cover the entire length of the substrate 22. The upstream washcoat layer 24 can be coated over at least 0.5 inches, and up to 5 inches, of the upstream portion of the substrate 22. An upstream washcoat layer 24 having a length of at least about 1.0 inches, and up to 3.5 inches, or from at least 1.5 inches and up to 2.5 inches, from the upstream edge of the catalytic member, are also exemplified. With the downstream washcoat portion 26 covering the remaining downstream portion of the substrate 22.

The length of the upstream washcoat layer 24 can also be described as a percentage of the length of the catalytic member from the upstream to downstream edge. Typically, the upstream washcoat layer 24 will comprise from about 5 to about 70% of the upstream length of the catalytic member. Also exemplified is an upstream washcoat layer 24 of up to about 20%, up to about 40%, and up to about 60% of the upstream length of the catalytic member 20. With the downstream washcoat portion 26 covering the remaining downstream portion of the substrate 22. Thus, the downstream washcoat portion 26 may comprise 95 to about 30% of the downstream portion 30 of the substrate 22.

During operation, exhaust gases flow through the diesel oxidation catalytic member 20 from the upstream edge 25 to the down stream edge 27. The precious metal catalysts contained in both the upstream 24 and downstream 26 washcoat layers, respectively, oxidize HC and CO pollutants contained in the exhaust gases.

In another embodiment, the lean NOx trap (LNT) system of the present invention can be included in an emission treatment system, wherein the lean NOx trap comprises one or more components or bricks in a multiple-component or multiple-brick system. In one embodiment, the top and undercoat washcoat compositions of the present invention may be coated onto a single carrier or substrate, as described hereinabove, wherein the coated substrate is one of multiple components in the emission treatment system. For example, the emission treatment system may further comprise, e.g., a diesel oxidation catalyst (DOC) and/or a particulate filter. In general any known diesel catalyst oxidation catalyst (DOC) and/or particulate fitter in the prior art can be used. In some cases, the particulate filter may be catalyzed, as known in the art.

In yet another embodiment, the emission treatment system of the present invention may comprise a multiple-brick arrangement, wherein the top and undercoat washcoat compositions of the present invention are coated onto two separate carrier substrates or bricks in the emission treatment system. For example, the lean NOx trap (LNT) system of the present invention, i.e., the top and undercoat washcoat compositions, may comprise distinct layers coated onto separate substrates or bricks as distinct washcoat layers. Optionally, a particulate filter can be used in conjunction with the top and undercoat washcoated substrates. In one embodiment either the top or undercoat washcoat composition of the present invention can be coated onto the particulate filter.

Figure 6:
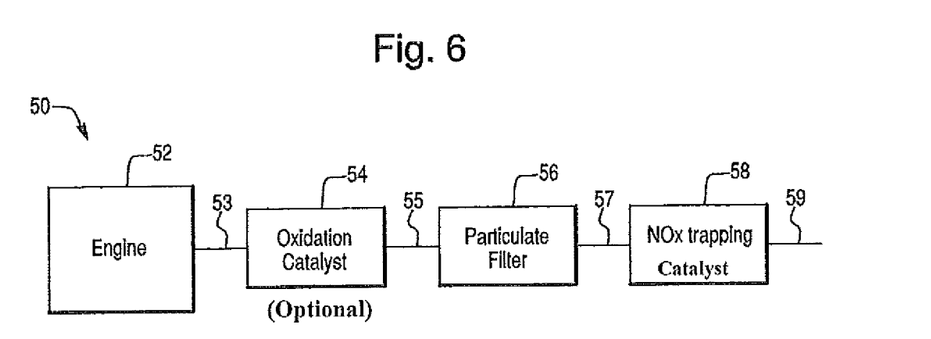
FIG. 6 is a schematic of an engine emission treatment system, in accordance with one embodiment of the present invention.
Figure 7:
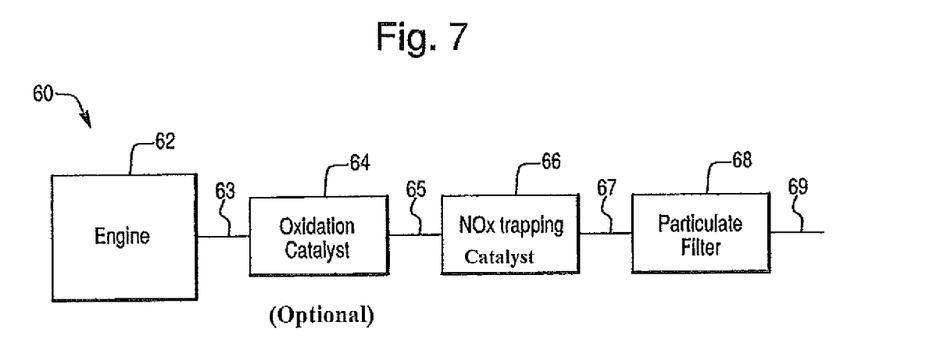
FIG. 7 is a schematic of an engine emission treatment system, in accordance with one embodiment of the present invention.

The emission treatment system of the present invention may be more readily appreciated by reference to FIGS. 6 and 7, which depict schematic representations of two exemplary emission treatment systems, in accordance with the present invention. Referring to FIG. 6, a schematic representation of an emission treatment system 50 is illustrated. An exhaust gas stream containing gaseous pollutants (e.g., unburned hydrocarbons, carbon monoxide and NOx) and particulate matter is conveyed via line 53 from an engine 52 to an oxidation catalyst 54. The oxidation catalyst 54 may be any known oxidation catalyst in the art, which can be used to treat exhaust gas emissions. For example, the oxidation catalyst 54 may be used to treat unburned gaseous and non-volatile hydrocarbons (i.e., the VOF) and carbon monoxides. In addition, a proportion of the NO of the NOx component may oxidized to $NO_2$ in the oxidation catalyst. The exhaust stream is subsequently conveyed via line 55 to a particulate filter 56, which traps particulate matter and/or catalyst poisons present within the exhaust gas stream. The particulate filter may be coated with the top washcoat composition of the present invention. In another embodiment, the particulate filter may comprise a wall-flow substrate coated with the top washcoat layer of the present invention. In accordance with the present invention, the top washcoat layer comprises one or more supported precious metal catalysts, ceria, and is devoid of any alkali or alkaline earth components. As such, the top washcoat layer is capable of oxidizing NOx at temperatures below 350° C., below 250° C., and even below 150° C. Optionally, the particulate filter may be additionally catalyzed with a soot burning catalyst for regeneration of the particulate filter 56. After removal of particulate matter, via the particulate filter 56, the exhaust gas stream is conveyed via line 57 to a downstream NOx trapping component. The NOx trapping component 58 may be coated with the undercoat washcoat composition of the present invention. The undercoat washcoat layer comprises one or more NOx trap materials in intimate contact with one or more supported precious metals. In accordance with the present invention, under lean burn conditions, the undercoat washcoat layer of the present invention can simultaneously store nitrogen oxides (NOx) and catalyzes the conversion of hydrocarbons and carbon monoxide in exhaust gas streams and the top washcoat layer can catalyze the oxidation of nitrogen oxides (NOx). Under subsequent rich burn conditions excess stored NOx can be released and oxidized by the catalysts contained in both the top and undercoat washcoat layers.

Referring to FIG. 7, a schematic representation of an emission treatment system 60 is illustrated. An exhaust gas stream containing gaseous pollutants (e.g., unburned hydrocarbons, carbon monoxide and NOx) and particulate matter is conveyed via line 63 from an engine 62 to an oxidation catalyst 64. The oxidation catalyst 64 may be any known oxidation catalyst in the art, which can be used to treat exhaust gas emissions. For example, the oxidation catalyst 64 may be used to treat unburned gaseous and non-volatile hydrocarbons (i.e., the VOF) and carbon monoxides. In addition, a proportion of the NO of the NOx component may oxidized to $NO_2$ in the oxidation catalyst. After treatment of the exhaust gas stream in the oxidation catalyst 64 the exhaust gas stream is conveyed via line 65 to a downstream NOx trapping component 66. The NOx trapping component 66 may be coated with the undercoat washcoat composition of the present invention. The undercoat washcoat layer comprises one or more NOx trap materials in intimate contact with one or more supported precious metals. In accordance with the present invention, under lean burn conditions, the undercoat washcoat layer of the present invention can simultaneously store nitrogen oxides (NOx) and catalyzes the conversion of hydrocarbons and carbon monoxide in exhaust gas streams and the top washcoat layer can catalyze the oxidation of nitrogen oxides (NOx). Under subsequent rich burn conditions excess stored NOx can be released and oxidized by the catalysts contained in both the top and undercoat washcoat layers. The exhaust stream is subsequently conveyed via line 67 to a particulate filter 68, which traps particulate matter and/or catalyst poisons present within the exhaust gas stream. The particulate filter may be coated with the top washcoat composition of the present invention. In another embodiment, the particulate filter may comprise a wall-flow substrate coated with the undercoat washcoat layer of the present invention. In accordance with the present invention, the top washcoat layer comprises one or more supported precious metal catalysts, ceria, and is devoid of any alkali or alkaline earth components. As such, the top washcoat layer is capable of oxidizing NOx at temperatures below 350° C., below 250° C., and even below 150° C. Optionally, the particulate filter may be additionally catalyzed with a soot burning catalyst for regeneration of the particulate filter 68.

Comparative Example (Prior Art)

A catalyst was prepared essentially in the same way described in Example 1 in U.S. Pat. No. 4,965,243 as a comparative example of this invention.

(a) 105 grams active gamma alumina powder was first impregnated with amine solution of platinum hydroxide (containing 1.77 grams Pt) and subsequently impregnated with a solution of rhodium nitrate (containing 0.127 grams Rh).

(b) The alumina containing platinum and rhodium obtained in step. (a), 33.5 grams of barium hydroxide octahydrate, 27.9 grams of ceria powder obtained from a commercial source, 5.45 grams of zirconyl acetate (containing 1.635 grams of $ZrO_2$), 18 grams of glacial acetic acid, and 105 grams DI water were well mixed to form a homogeneous slurry. The particles in the slurry were diminished to 90% having a particle diameter less than 9 microns.

(c) The coating slurry from step (b) was applied to a cylindrical monolithic cordierite core (400 cells/in$^2$) to obtain a washcoat comprising 93.33 g/ft$^3$ Pt, 6.67 g/ft$^3$ Rh, 3.2 g/in$^3$ active alumina, 0.85 g/in$^3$ $CeO_2$, 0.5 g/in$^3$ BaO, and 0.05 g/in$^3$ $ZrO_2$. The resulting catalyst was calcined at 500° C. for one hour to obtain a comparative catalyst A.

Inventive Example 1

The following example illustrates one aspect of the present invention. This example exemplifies a two-layer coating formulation bearing the same total precious metal loading and base metal loading as the comparative example. This two-layer formulation comprises an undercoat layer and a top washcoat layer, were coated onto a substrate carrier, the top washcoat layer being coated over the entire undercoat washcoat layer.
Preparation of Undercoat Washcoat Layer (a) 96 grams active gamma alumina powder was impregnated with amine solution of platinum hydroxide (containing 1.565 grams Pt).

(b) The alumina containing platinum obtained in step (a), 61.7 grams barium hydroxide octahydrate, 21 grams ceria powder obtained from a commercial source, 10 grams zirconyl acetate (containing 3 grams $ZrO_2$), 23 grams glacial acetic acid, and 70 grams DI water were well mixed to form a homogeneous slurry. The particles in the slurry were diminished to 90% having a particle diameter less than 9 microns.

(c) The coating slurry obtained in step (b) was applied to a cylindrical monolithic cordierite core (400 cells/in$^2$) to obtain a washcoat comprising 1.6 g/in$^3$ active alumina bearing 45 g/ft$^3$ Pt, 0.5 g/in$^3$ BaO, 0.35 g/in$^3$ $CeO_2$, and 0.05 g/in$^3$ $ZrO_2$. The resulting catalyst was calcined at 500° C. for one hour to obtain a catalyst having the desirable undercoat layer.

Preparation of Topcoat Washcoat Layer (d) 150 grams active gamma alumina powder was impregnated with amine solution of platinum hydroxide. The impregnated powder, 10 grams glacial acetic acid, and 80 grams DI water were well mixed to form homogeneous slurry. The particles in the slurry were diminished to 90% having a particle diameter less than 9 microns.

(e) 50 grams ceria powder was pre-milled in 50 grams DI water to form slurry having a particle diameter 90% less than 9 microns. 40 grams rhodium nitrate solution (containing 0.39 gram Rh) was added to the ceria slurry under constant mixing.

(f) Alumina slurry bearing Pt from step (d) and ceria slurry bearing Rh from step (e) were mixed well. 12.9 grams oxalic acid was added to the combine slurry to form the final topcoat coating slurry.

(g) The coating slurry from step (0 was applied to the monolithic core bearing the calcined undercoat washcoat layer obtained in step (c) to obtain a topcoat washcoat comprising 1.5 g/in$^3$ alumina bearing 48.33 g/ft$^3$ Pt and 0.5 g/in$^3$ ceria bearing 6.67 g/ft$^3$ Rh. No alkali or alkaline earth component was present in the topcoat washcoat.

After drying at 120° C. and calcining at 500° C. for one hour in flowing air, the resulting layered catalyst of this invention comprises a total of 93.33 g/ft$^3$ Pt, 6.67 g/ft$^3$ Rh, 3.1 g/in$^3$ active alumina, 0.85 g/in$^3$ ceria, 0.5 g/in$^3$ BaO, and 0.05 g/in$^3$ $ZrO_2$.

Test Example

Figure 8:
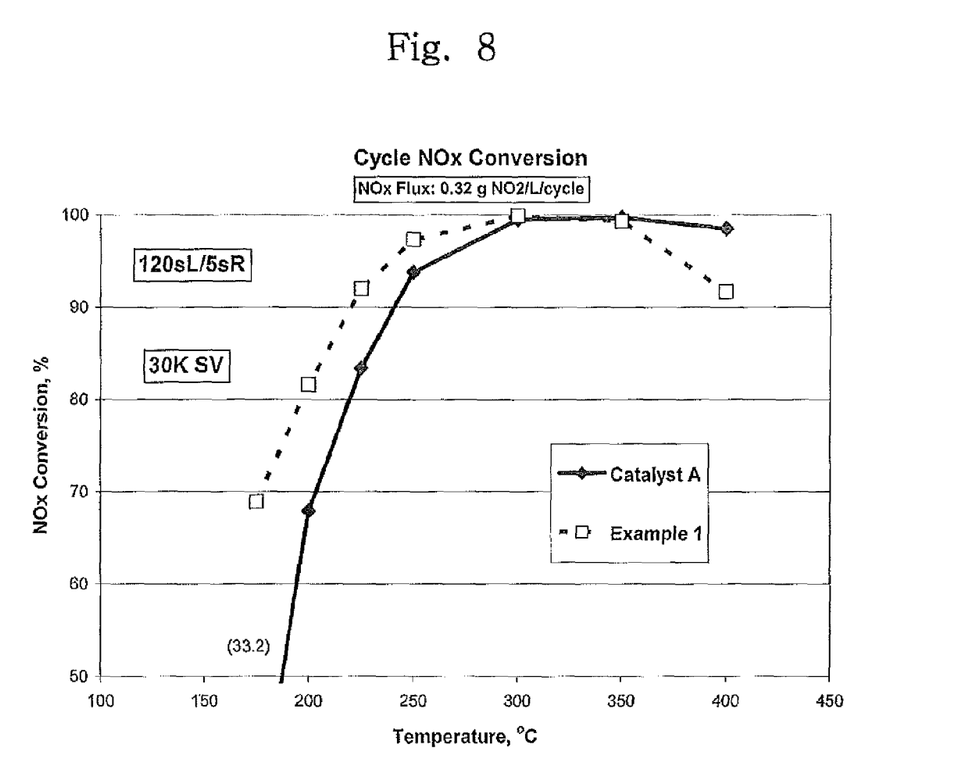
FIG. 8 presents the cycle NOx conversion efficiency of catalyst of one embodiment of this invention in comparison with a conventional catalyst of prior art.

Catalytic performance of the monolithic catalysts was conducted in a laboratory reactor after each monolithic catalyst was aged in flowing air containing 10% steam at 800° C. for 5 hours. The NOx conversion efficiency was determined by cycling the lean and rich feed gas at a frequency of 120 seconds lean gas exposure and subsequent 5 seconds rich exposure. The lean feed gas consists of 167 ppm NOx, 10% $O_2$, 5% $CO_2$, 8% $H_2O$ balance by nitrogen and the rich feed gas contains 4.5% CO, 1.5% $H_2$, 1667 ppm $C_3H_6$, 1% $O_2$, 5% $CO_2$, 8% $H_2O$ balance by nitrogen. A minimum of 12 cycles were run to obtain a cycle average NOx conversion efficiency at each evaluation temperature. The test space velocity was maintained at a constant rate of 30,000 hr$^{-1}$ through all tests. The temperature reported in each figures were based on the feed gas temperature of the inlet of the catalyst. FIG. 8 shows the cycle NOx conversion of the catalyst of this invention and comparative catalyst A. The trapping capacity was determined by calculating the total amount of NOx trapped by the catalyst when catalyst trapping efficiency dropped from 100% to 80% upon exposure to lean feed gas after the last lean/rich cycle at each evaluation temperature. This refers to the "80% NOx trapping capacity, g NO2/L" reported in FIG. 9.

Figure 9:
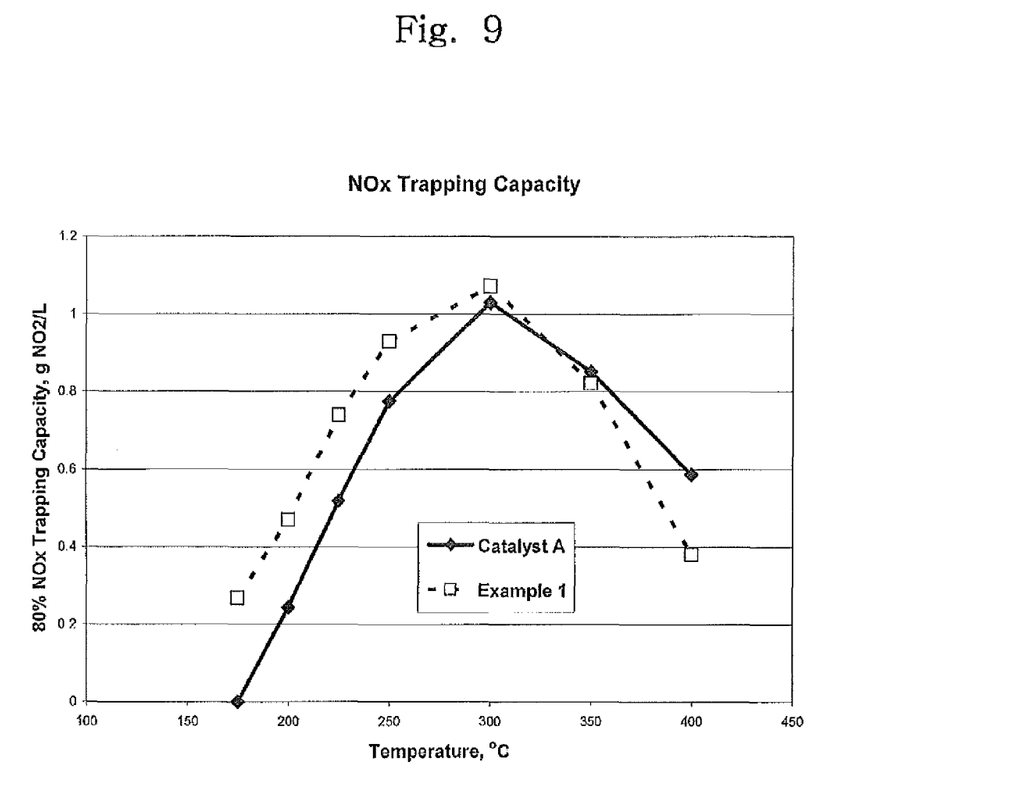
FIG. 9 compares the NOx trapping capacity of catalyst of one embodiment of this invention with that of a conventional catalyst.

In FIG. 8, the layered catalyst Example 1 of this invention clearly outperforms the conventional Catalyst A in cycle NOx conversion at temperatures below 250° C. Catalyst A and Example 1 of this invention exhibit almost identical catalyst chemical compositions, but the layered configuration of Example 1 minimizes the deleterious effect of intimate contact of precious metal and alkaline earth elements for low temperature performance. In FIG. 9, NOx trapping capacity of the catalyst of this invention and conventional catalyst was compared. The 80% trapping capacity correlates with a quantity of NOx that can be stored on catalyst before required regeneration to give a desired NOx conversion. The higher the capacity at each temperature means the longer the catalyst can be in the NOx storing mode, thus less fuel penalty. The data of FIG. 9 illustrate the superiority of NOx trapping at lower temperatures of the catalyst of this invention.

Inventive Example 2

This example exemplifies a two-layer coating formulation useful for the treatment of exhaust gases, in accordance with one embodiment of the present invention. This two-layer formulation comprises an undercoat layer and a top washcoat layer, which were coated onto a substrate carrier, the top washcoat layer being coated over the undercoat washcoat layer. The undercoat washcoat layer contained 0.6 g/in$^3$ (15 g/ft$^3$) of platinum and 0.6 g/in$^3$ (2 g/ft$^3$) of palladium impregnated a support composition comprising 0.25 g/in$^3$ BaO, 0.05 g/in$^3$ ZrO$_2$, 0.10 g/in$^3$ Ceria and 0.10 g/in$^3$ Sr. The total washcoat composition of the top washcoat layer comprises about 1.7 g/in$^3$. The coated carrier was then calcined at 530° C. for 2 hours.

The top washcoat layer was applied to the surface of the undercoat layer. The top washcoat layer comprises 1.2 g/in$^3$ (70 g/ft$^3$) Pt/SBA150, 0.8 g/in$^3$ (8 g/ft$^3$) and 0.6 g/in$^3$ Rh/HAS-5. The resultant carrier was then calcined at 430° C. for 2 hours.

While the invention has been described in detailed with respect to specific embodiment thereof, it will be apparent that upon reading and understanding of the detail disclosure, variations thereof may occur to those skilled in the art which lie within the scope of the appended claims.

What is claimed is:

1. A combined lean NOx trap/catalyst system for treatment of exhaust gas emissions, comprising:
   a. a carrier substrate;
   b. an undercoat washcoat layer comprising a support material, one or more precious metals and one or more NOx trapping components, wherein said undercoat layer is coated on said carrier substrate; and
   c. a top washcoat layer comprising a support material, one or more precious metals, and ceria, said top washcoat layer being devoid of alkali or alkaline earth components, and wherein said top washcoat layer is coated on said carrier substrate,
   wherein said top washcoat layer is coated over an upstream portion of said substrate and said undercoat washcoat layer is coated over a downstream portion of said substrate.

2. The lean NOx trap/catalyst of claim 1, wherein said top washcoat layer is coated over about 5 to about 70% of the upstream length of said substrate and wherein said undercoat washcoat layer is coated over the remaining downstream portion of the substrate.

3. The NOx trap/catalyst of claim 1, wherein said support material is a refractory oxide support.

4. The NOx trap/catalyst of claim 1, wherein said NOx trapping component in said undercoat washcoat layer comprises an oxide, hydroxide, and/or carbonates of alkali earth metals, alkaline earth metals, lanthanum group metals, ceria or a combination thereof.

5. The NOx trap/catalyst of claim 4, wherein said NOx trapping component is an oxide of an alkali or alkaline earth metal.

6. An exhaust gas treatment system for treating exhaust gas emissions from a lean burn engine comprising:
   a. a multiple-brick arrangement comprising at least two bricks;
   b. wherein said first brick contains a washcoat layer comprising a support material, one or more precious metals, ceria and is devoid of any alkali or alkaline earth components; and
   c. wherein said second brick consists essentially of a support material, one or more precious metals and one or more NOx trapping components.

7. The exhaust gas treatment system of claim 6, wherein said first brick is located upstream of said second brick.

8. The exhaust gas treatment system of claim 6, wherein said second brick is located upstream of said first brick.

9. The exhaust gas treatment system of claim 6, wherein one of said first brick or said second brick further comprises a particulate filter.

10. The exhaust gas treatment system of claim 6, wherein said support material is a refractory oxide support.

11. The exhaust gas treatment system of claim 6, wherein said NOx trapping component in said second brick comprises an oxide, hydroxide, and/or carbonates of alkali earth metals, alkaline earth metals, lanthanum group metals, ceria or a combination thereof.

12. The exhaust gas treatment system of claim 6, wherein said NOx trapping component is an oxide of an alkali or alkaline earth metal.

13. A method for treating exhaust gas emissions from lean burn engine, said method comprising the steps of:
   a. providing a combined NOx trap/catalyst component, comprising:
      i. a carrier substrate;
      ii. an undercoat washcoat layer consists essentially of a support material, one or more precious metals and one or more NOx trapping components, wherein said undercoat washcoat layer is coated on said carrier substrate; and
      iii. a top washcoat layer comprising a support material, one or more precious metals, and ceria, said top washcoat layer being devoid of alkali or alkaline earth components, and wherein said top washcoat layer is coated on said carrier substrate,
   b. passing an exhaust gas stream comprising unburned hydrocarbons, carbon monoxides and nitrogen oxides, from a lean burn engine across said carrier substrate;
   c. wherein under lean burn conditions said undercoat washcoat layer is capable of simultaneously storing nitrogen oxides (NOx) and catalyzing the conversion of hydrocarbons (HC) and carbon monoxides (CO), and said top washcoat layer is capable of oxidizing nitrogen oxides (NOx) and catalyzing the conversion of hydrocarbons and carbon monoxides (CO); and
   d. wherein under rich burn conditions both of said top and undercoat washcoat layers are capable of releasing and oxidizing nitrogen oxides (NOx) and catalyzing the conversion of hydrocarbons and carbon monoxide.

14. The method of claim 13, wherein said NOx trap/catalyst component is capable of treating exhaust gas emissions at a temperature of from about 100° C. to about 500° C.

15. The method of claim 13, wherein said top washcoat layer is capable of oxidizing NOx at temperatures below 350° C.

16. The method of claim 13, wherein said undercoat washcoat layer is coated over the entire axial length of said substrate and said top washcoat layer is coated over said undercoat washcoat layer.

17. The method of claim 13, wherein said top washcoat layer is coated over an upstream portion of said substrate and said undercoat washcoat layer is coated over a downstream portion of said substrate.

18. The method of claim 13, wherein said top washcoat layer and said undercoat washcoat layer are coated on separate bricks of a multiple-brick emission treatment system.

\* \* \* \* \*